March 1, 1966  R. E. BURTON  3,238,124
METHOD AND APPARATUS FOR TREATING WASTE LIQUIDS
Filed March 8, 1965  6 Sheets-Sheet 1

INVENTOR.
Robert Edward Burton
BY
Attorneys

INVENTOR.
Robert Edward Burton
Attorneys

March 1, 1966  R. E. BURTON  3,238,124
METHOD AND APPARATUS FOR TREATING WASTE LIQUIDS
Filed March 8, 1965  6 Sheets-Sheet 3

INVENTOR.
Robert Edward Burton
BY
Attorneys

March 1, 1966  R. E. BURTON  3,238,124
METHOD AND APPARATUS FOR TREATING WASTE LIQUIDS
Filed March 8, 1965  6 Sheets-Sheet 4

INVENTOR.
Robert Edward Burton
BY
Attorneys

March 1, 1966 R. E. BURTON 3,238,124
METHOD AND APPARATUS FOR TREATING WASTE LIQUIDS
Filed March 8, 1965 6 Sheets-Sheet 5

INVENTOR.
Robert Edward Burton
BY
*Flehr and Swain*
ATTORNEYS

United States Patent Office

3,238,124
Patented Mar. 1, 1966

3,238,124
METHOD AND APPARATUS FOR TREATING WASTE LIQUIDS
Robert E. Burton, 457 San Francisco Ave., Willits, Calif.
Filed Mar. 8, 1965, Ser. No. 438,023
32 Claims. (Cl. 210—3)

This application is a continuation-in-part of my earlier filed applications, Serial No. 223,136, filed September 12, 1962, and Serial No. 342,432, filed February 4, 1964.

This invention generally relates to the treatment of various liquid wastes, including raw and partially clarified sewage, municipal and commercial waste waters and similar liquid wastes, and more particularly relates to methods and means useful in carrying out such treatment by which separation and removal of colloidal solids as well as other beneficial effects can be obtained.

There was a time when virtually all liquid wastes were turned loose into the nearest stream irrespective of odor, color or toxicity. Today, stringent procedures are required by or imposed upon most municipalities, manufacturers, developers, home owners, and the like to insure adequate disposal of waste waters, with the result that much time and energy are spent in ascertaining how either to neutralize the waste, to destroy it, or to turn it into something useful (see Technical Report W62–9, "Advanced Waste Treatment Research—1," U.S. Department of Health, Education and Welfare). However, despite the best efforts made today, it is not always possible to successfully dispose of wastes, particularly in the case of liquid wastes containing dispersed microscopic or colloidal waste solids. Since colloidal solids result from the breakdown of virtually all living matter, including foods (e.g., proteins and starches), fabrics (natural or synthetic), building materials (woods, bricks, etc.), nearly all waste systems contain appreciable amounts of colloidal contaminants. A solution to the problem of separating and removing these colloidal solids from waste waters is therefore highly to be desired.

By way of illustration, most sewage treating processes involve filtering or other mechanical clarification to remove settleable solids, following which the liquid effluent containing dissolved and suspended solids is subjected to the action of aerobic microorganisms, or activated sludge systems, to effect digestion of contaminants. However, these systems are generally ineffective to remove the large amounts of colloidal solids normally present, with the result that substantial amounts of such colloidal solids remain in the "clarified" discharge. The presence of colloidal solids has also made it virtually impossible to effectively process sewage in closed cycle or self-contained treating systems.

Problems arising from the presence of colloidal solids are encountered with various other types of industrial waste liquids. For example, the canning of various types of pulpy foods, such as pumpkin, peaches, various vegetables, etc., produces large amounts of effluent liquids (canning wastes) containing colloidal organic solids. Wastes from breweries, meat packing plants, milk processing plants, rendering plants, and other food processors present similar problems. These wastes are frequently discharged to trickling filters or similar treatment systems in an effort to purify the wastes, thereby presenting problems of contamination with colloidal solids similar to those outlined above. The chemical industries also produce large quantities of fluid wastes containing colloidal solids. Examples include sulfite wastes from paper mills, tannery wastes, fermentation "slops," zeolite brines, and so on.

In general, one object of the present invention is to provide a relatively simple, highly effective method and means for treating waste waters such as sewage and other liquid systems, and for separating and removing therefrom colloidal solids.

Another object of the invention is to provide a method and means of such character capable of reducing the biological oxygen demand of such waste liquids simultaneously with the separation of colloidal solids.

A further object of the invention is to provide a method and means of the above character capable of use with a wide variety of liquid waste systems to effect removal of colloidal waste solids.

A further particular object of the invention is to provide a method and means of such character adapted to use in a completely self-contained, closed cycle sewage disposal system.

Another object of the invention is to provide an improved method and means of the above character that does not require complicated procedures or machinery, and which is adaptable to virtually any present day system for disposal of waste liquids.

Another particular object of the invention is to provide improved methods and means of such character which utilize the colloidal waste solids and turn them into something having commercial value.

Another object of the invention is to provide improved systems of such character which are highly efficient in that they remove virtually all the colloidal waste or colloidal solids present in the liquid system.

Another object is to provide an improved method and means for reducing the biological oxygen demand of waste liquids wherein use is made of a hanging fiber system characterized by an unusually large internal surface area.

Another particular object of the invention is to use such a hanging fiber system in conjunction with a completely self-contained, closed cycle, sewage treating system.

A still further object of the invention is to provide an improved method and means of such character which provides a maximum liquid-gas interface for restoration of dissolved oxygen to the waste liquids and for dissipation of heat generated by microbiological activity.

Additional objects and advantages of the invention will appear from the following description in which illustrative embodiments have been set forth in detail in conjunction with the accompanying drawings:

Referring to the drawings.

The present invention is predicated on my discovery that colloidal solids dispersed in liquid waste systems can be selectively attracted to natural bark fibres, for example, redwood and similar bark fibers, and can thereby effectively be separated from liquid moving in contact with or passing through such fibers. The present invention is further dependent upon my discovery that the amount of dissolved oxygen present in waste liquids can be rapidly and effectively increased by allowing the waste liquid to descend along the surface of strips of bark fiber, such as redwood and similar bark fibers, and particularly such barks which have been preconditioned to enlarge the exposed surface area of the individual fibers contained in the bark strips. I have additionally found that by combining these two concepts, it is possible to remove colloidal solids from virtually any liquid system containing such solids (including raw or clarified sewage, cannery wastes or other wastes from food processing systems), and at the same time to restore oxygen to such liquids to thereby effectively reduce the biological oxygen demand (BOD). I have further found that these concepts can be combined into a particular embodiment of my invention to provide a completely self-contained, closed cycle sewage disposal system wherein the only requirements for successful operation of the system are a sufficient supply of air (or oxygen) and water for makeup or replacement of liquids circulating in the system.

Broadly stated, my new process involves the dispersion of a profusion of substantially individualized bark fibers in a body of liquid waste material containing colloidal solids so that the fibers are surrounded by the liquid. In such condition, the fibers attract the colloidal solids, apparently by the mechanism of cataphoresis or electrophoresis, as hereinafter explained, following which a portion of the liquid is separated from the fibers and attached colloidal solids. The separated liquid is then circulated over a hanging fiber section, comprising strips of the elongate bark fibers characterized by an unusually large surface area in relation to the volume of the strips. The circulated liquid descends along the large surface area of these bark fibers, as very thin films which require prolonged periods of time (i.e., many minutes) to descend the length of the fibers. The net result is an unusually large liquid-gas interface at the surface of the thin films, and a resulting substantial increase in the capacity of the circulated liquid to absorb oxygen. In a preferred embodiment of the invention, the strips of elongate bark fibers are suspended over a body of liquid containing relatively short dispersed fibers, permitting the films of liquid to pass into the body of liquid as part of a continuous circulatory system.

A chief advantage of my new process lies in the removal of colloidal solids from liquid waste systems. As is well known, the colloidal state is determined by the size of the solid particles, being intermediate in size between visibly suspended particles and invisible molecules (i.e., ranging from 0.001 to 0.01 microns). As used herein, the term "colloidal solids" is intended to include particles within this range of sizes brought into the colloidal state either by comminution or dispersion from macroscopic size (i.e., visible to the eye) to ultramicroscopic or colloidal size or, conversely, by agglomeration, precipitation, or condensation from sub-ultramicroscopic or molecular or solution size to colloidal size. The term is also intended to include such particles either with or without accompanying particles large enough to settle out of the fluid medium.

A further advantage of my new process resides in its adaptablity to use in a closed cycle, waste treating system to effectively handle both colloidal and gross solids, such as the gross solids normally present in sewage. The result is possible because of the favorable ecological conditions possible in my closed cycle systems due to the separation of colloidal solids to nurture biological activity, and the simultaneous aeration of circulating liquids to reduce the biological oxygen demand (BOD) of the circulating liquids. Such conditions favor the establishment and maintenance of a balanced biological community within the closed cycle system, highly organized to attack and consume both the gross and colloidal solids. From a practical standpoint, this feature of my process enables the construction and use of closed cycle, portable, self-contained, highly effective sewage treating units (see FIGURE 10), useful, for example, in rural areas.

*General process*

My process can best the understood after a description of the apparatus illustrated in the drawing.

Figure 1:
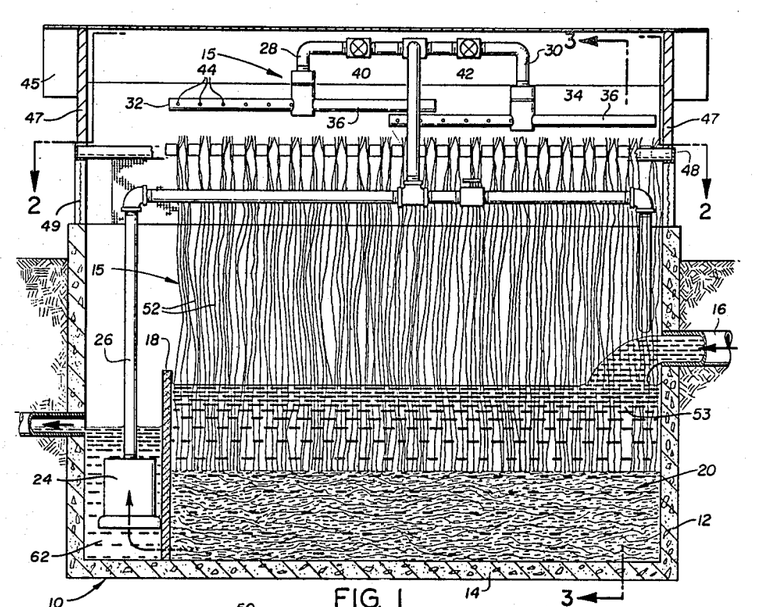
FIGURE 1 is a view in longitudinal section illustrating a liquid waste treating system in accordance with the invention.

As shown in the embodiment illustrated in FIGURE 1, a reservoir or tank 10 is provided which is dimensioned in accordance with capacity requirements. In general, the reservoir can be formed by suitable side and bottom wall means 12 and 14, and should be of a size to receive and easily process expected amounts of waste liquids to be fed to the system. The top of the reservoir should be open to permit the mounting of a hanging fiber section 15 in such fashion that the lower ends of the fibers are supported in spaced relation above the floor of the reservoir. In conjunction with the reservoir 10, I provide an inlet 16 for waste liquids fed to the system, screening or barrier means 18 adapted to form a pond or body of waste liquid 20 within the reservoir, and discharge outlet 22 by which treated waste liquid is discharged from the system. A circulatory system 25 is also provided and includes a pump 24 on the downstream of the screen 18, a main distribution line 26 leading upward from the pump, branch lines 28 and 30, and distribution heads 32 and 34. In the apparatus illustrated in FIGURE 1, the distribution heads consist of lengths of pipe 36, closed at their ends, and rotatably supported by means of swivel couplings 40 and 42. Opposite ends of the pipes 36 are provided with oppositely directed discharge outlets 44, so that rotation of the heads is effected by reaction to the discharge of liquid through the outlets. The resulting rotary distribution of circulated liquid is clearly shown in FIGURE 2.

Figure 2:
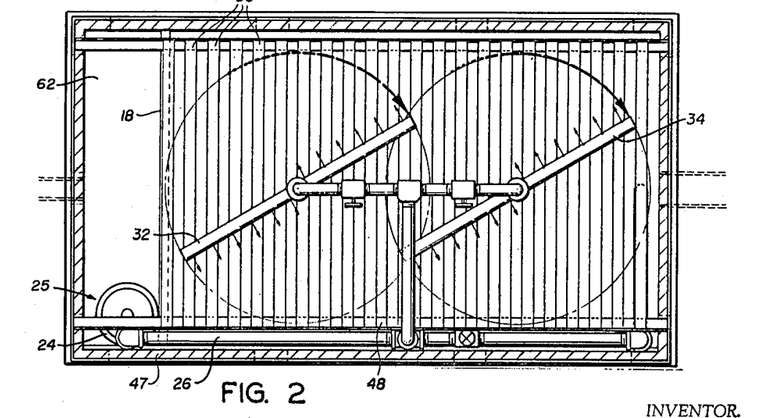
FIGURE 2 is a view in horizontal section along the line 2—2 of FIGURE 1.
Figure 3:
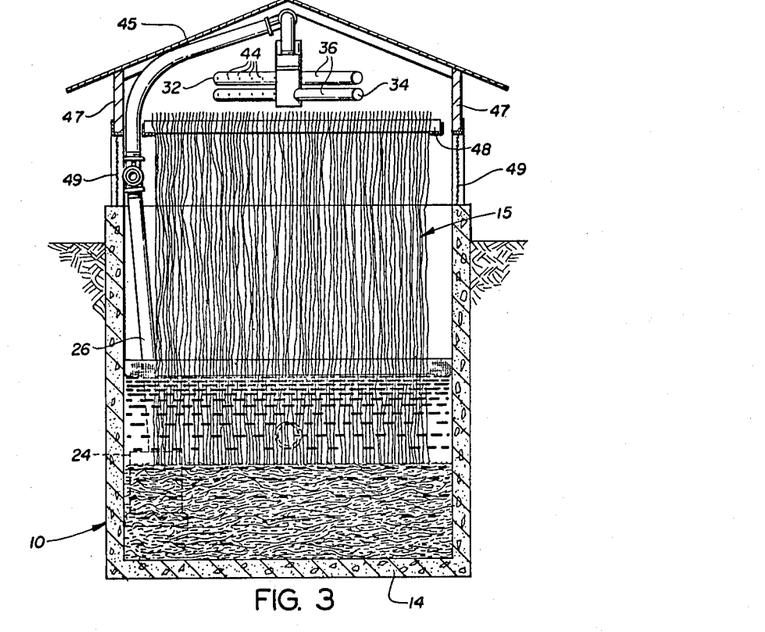
FIGURE 3 is a view in vertical section along the line 3—3 of FIGURE 1.
Figure 4:
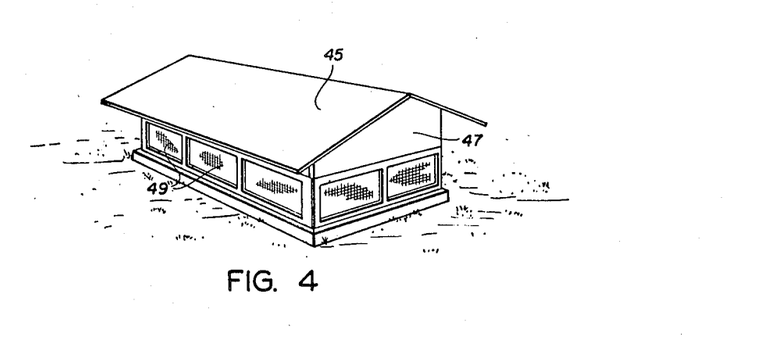
FIGURE 4 is a perspective view on a reduced scale, showing the portion of the waste treating system visible from above ground.

The hanging fiber section 15 can be mounted beneath the distribution heads 32, 34 on a frame or other suitable support 48. As shown in FIGURE 2, the frame 48 generally coincides in size with the surface of the body of liquid 20 in the reservoir, and preferably includes cross members or lateral supports 50 appropriately spaced to permit the attachment of the strips of bark or bark fibers comprising the hanging fiber section 15. In general, I prefer to employ a profusion of specially processed bark strips 52, composed of redwood or like bark fibers, wherein the strips have been subjected to longitudinal and transverse shear stresses designed to break down the fiber structure of the strips and to open the fiber structure without changing the overall configuration of the bark strips. Such processing serves to greatly enlarge the exposed surface area of the individual bark fibers in each strip, and thereby greatly multiply the bark fiber surface exposed to air currents circulating through the hanging fiber section. As illustrated in FIGURES 1 and 3, each strip of bark fiber is suspended on a lateral support 50 of the frame 48 in such fashion that the separated individual fibers hang downward into the body of liquid 20 in the reservoir 10. As will hereinafter be explained, this construction permits thin films of waste liquid to descend from the circulatory system to the reservoir in such manner as to effectively aerate the circulating liquid.

Figure 8:
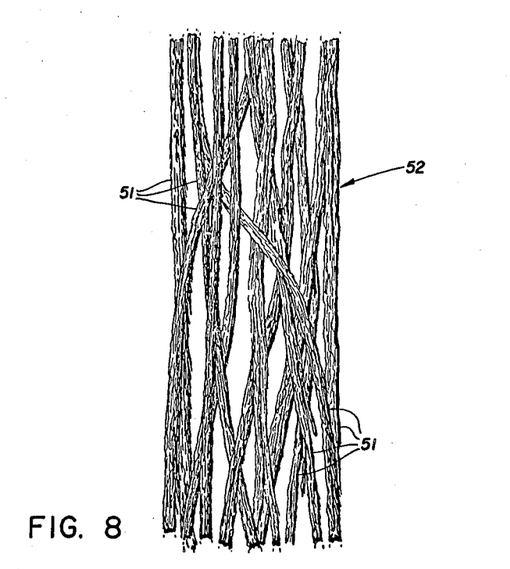
FIGURE 8 is an enlarged detail view, illustrating a portion of a hanging fiber system used in the invention.

The strips of bark 52, generally represented in FIGURE 8, can be of the type produced by an existing machine consisting of a pair of pressure rolls provided with encircling ridges or convolutions which mesh with one another and firmly grip strips of bark fed endwise into the machine. Guide rolls are also provided and serve to bend the bark into a generally U-shaped configuration as it passes through the pressure rolls. The described construction serves to simultaneously subject the bark to bending and rolling shear to break down the long fibers and to spread these fibers transversely. Strips of bark processed with this machine retain their initial strip configuration but are uniquely characterized by an exceptionally large internal surface area. This internal surface surface substantially increases the total exposed surface area of the fibers in the individual strips 52. By way of illustration, I have found this surface area to be of the order of 600 to 700 square feet per cubic foot of bark, and frequently as high as 800 to 1000 square feet per cubic foot. In any event, the combined internal and external surface area per cubic foot of bark (in the hanging fiber section 15) should not be less than about 500 square feet per cubic foot.

Referring to FIGURES 1 to 4, the waste disposal unit is shown as an underground system adapted to installation at any convenient point adjacent the source of waste liquid. As illustrated, the unit can include a roof 45 to protect the pond and hanging fiber section from the elements. The roof can be supported by upstanding wall means 47, suitably provided with ventilation openings 49 to insure proper circulation of air through the hanging fiber section 15. The openings 49 are generally screened to prevent entry of leaves, animals, and the like into the unit.

In the practice of the present invention as illustrated in FIGURES 1 to 4, waste liquid is first introduced through the inlet 16 to form a body of liquid 20 of desired depth and volume, as illustrated in FIGURES 1 and 3. The body of liquid is then seeded with a profusion of substantially individualized bark fibers, particularly redwood bark fibers, which are dispersed throughout the body of liquid. The specially processed strips of bark fibers 52 are now positioned so that their lower ends are in contact with the body of liquid in the reservoir. Preferably the strips extend a substantial distance into the body of liquid, as shown in FIGURES 1 and 3. In a typical illustration, the body of liquid may be of a depth approximating four to ten feet. Individual strips of bark 52 may have a length of approximately four to twelve feet, with one-fifth to one-third of this length immersed in the body of liquid.

In accordance with the invention, the bark fibers dispersed in the tank 10 are substantially individualized bark fibers, particularly redwood bark fibers obtained from customary lumber or mill operations. As is well known, the methods employed in lumbering the California redwood, Douglas fir, and similar commercial woods produce substantial amounts of bark. By way is illustration, the unusual thickness of redwood bark (e.g., averaging two to ten inches in old growth) normally produces as much as 400 to 600 cords of bark per million feet of board measure (Spaulding). Strips of bark obtained from conventional debarking and shredding operations normally range from eight to in excess of twenty feet of length. This bark can be processed in the manner described above to produce the desired strips of bark 52 for the hanging fiber section 15. Alternatively, this bark can be processed in a manner customary at most lumber mills, to separate dust from the fibers. Approximately fifty percent of the bark so processed is recovered from conventional debarking, shredding and dust separation operations (e.g., employing hydraulic debarkers, belt type shredders, swinging hammer-type hogs, flails, rotary and vibratory screens, etc.) in the form of relatively short individualized fibers adapted to use in the present invention, specifically in the treating pond 20. While these short fibers can be obtained from various commercial sources a particularly satisfactory source of such fibers is disclosed in U.S. Patent 3,042,977. As therein disclosed, the fibers are collected in the form of loosely felted pads which can be readily broken apart to provide the substantially individualized fibers. Individual fibers resulting from this processing have a diameter comparable to that of the separated, elongated fibers in the strips of bark 52 (i.e., no greater than about 1 millimeter). However they are much shorter in length, ranging from about 1 to 10 centimeters in length.

Figure 9:
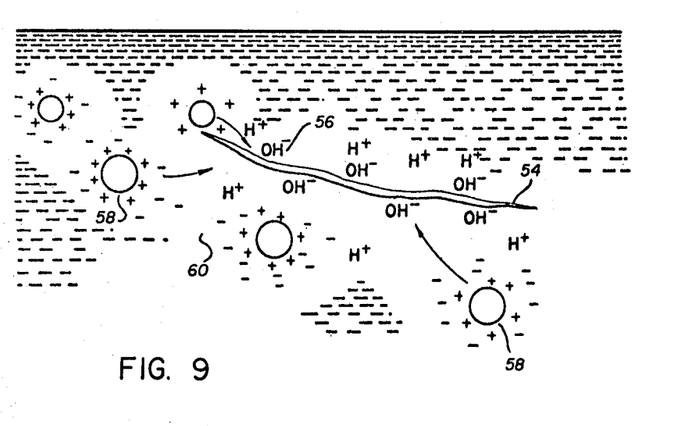
FIGURE 9 is a schematic representation, on a greatly enlarged scale, illustrating the separation of colloidal solids in accordance with the invention.

My process is best described by reference to a particular waste liquid undergoing treatment, for example, raw sewage, canning waste, or like material, contaminated with organic colloidal solids. The contaminated liquid containing both colloidal and gross solids enters the system through the conduit 16 and mixes with the body of liquid 20 in the zone 53. In accordance with the invention, the freely dispersed, relatively short bark fibers in the body of liquid 20 attract the colloidal solids in the entering liquid causing the solids to adhere to the fibers, thereby effectively separating the solids. As explained in my earlier filed copending application, Serial No. 223,136, filed September 12, 1962, this unexpected attraction of the bark fibers for colloidal solids is believed to result from an electrostatic charge on the surface of the fibers, due apparently to adsorption of hydroxyl ion from water, which is opposite to the electrostatic charge of colloidal particles in the liquid. This phenomena is schematically represented in FIGURE 9, wherein 54 represents a bark fiber of the type dispersed in the tank 10, and 56 the hydroxyl ion adsorbed on the fiber. It is believed that the hydroxyl ion is adsorbed in such fashion that the hydrogen ion forms the outer layer 60, with the result that the bark fiber is characterized by an essentially negative charge. In a stable colloidal system, such as exists in the clarified sewage or canning waste liquid entering the body of liquid 20, anions on the surface of the colliodal micelles continually unite with the cations in the liquid system to form molecules which attach themselves to the surface of the colloidal micelles, whereas the molecules on the surface of the colloidal micelles continually break up into anions and cations. Accordingly, under equilibrium conditions, the colloidal micelles carry a predominantly positive charge, as indicated at 58, creating a strong electrostatic attraction (electrophoresis) between the micelles and the negatively charged bark fibers 54.

In a liquid system of the type illustrated in FIGURE 1 the colloidal particles are attracted to the bark fibers in more or less continuous fashion, until the space around an individual fiber is substantially covered by the colloidal micelles. If this phenomena of attraction were to continue without interruption, for example, for a period of a few days or weeks, the suspended fibers would soon become clogged with the colloidal solids. To prevent this, the present invention makes use of a microbiological community which is introduced to the body of liquid 20 and maintained therein throughout the operation of the waste disposal system. The microbiological community e.g., bacteria paramecium, etc.) may be naturally present in the waste liquid, or artifically introduced. In accordance with the present invention, the microbiological community is comprised of aerobic microorganisms which serve to renew the fibers for continued use in the separation process. More specifically, these microorganisms digest the colloidal solids attached to the bark fibers thereby permitting the fibers to again attract the colloidal solids in a continuous cycle. In this way a virtually complete separation of colloidal contaminants from the entering waste liquid can be obtained, due to the effect of the aerobic microorganisms and the extensive surface area presented to the entering liquid by the profusion of freely dispersed fibers. Moreover, as is well known, the aerobic microorganisms produce an effluent which is not foul, and are effectively used in my system to permit a direct discharge of waste effluent from the system through the discharge 22, into streams, or into soil areas where dilution is not easily practiced or desirable.

As is well known, all existing aerobic processes require the presence of substantial amounts of dissolved oxygen in the water or aqueous media employed. However, waste liquids such as sewage, canning wastes and the like are notably deficient in dissolved oxygen, and are characterized by a substantial biological oxygen demand (BOD). In the processing of the present invention, this biological oxygen demand is satisfied or reduced by the novel technique of circulating effluent from the pond 20 over the hanging fiber section 15, positioned immediately above the pond. As will hereinafter be explained, the unique structure of the hanging fiber section serves to effectively increase the dissolved oxygen in the circulating effluent, so that it contains sufficient dissolved oxygen to maintain the microbiological community in the pond.

As related to the apparatus illustrated in FIGURE 1, the dispersed bark fibers are first separated from the effluent liquid by the screening device 18, which in the present invention may consist of a mat of the same fibers, screening, wire mesh, etc. The effluent is then conveyed from an intermediate discharge zone 62 by means of the pump 24, and distribution lines 26, 28 and 30, to the rotary distribution heads 32, 34. If desired, a portion of the circulated effluent can bypass the distribution heads, and discharge through return line 27 to increase the turbulent mixing in zone 53. In any event, the effluent liquid discharged by the heads 32, 34 (now freed of the colloidal solids) is splashed over the hanging fiber system and descends along the exposed surfaces of the profusion of individual fibers 51 making up the bark strips 52 as a myriad of thin liquid films (see FIGURE 2). Since, at normal temperatures and pressures, the amount of oxygen absorbed by the descending liquid is a function of the area of liquid-gas interface and time of contact, conditions are presented which greatly encourage absorption of oxygen into the descending films of liquid. It is essential however that sufficient liquid be circulated through the circulatory system 25 and over the hanging fiber section 15 to supply the oxygen demand of the microbiological community in the tank 20. In general, I have found that a rate of effluent circulation through the circulatory system 25 ranging from about 5:1 to 20:1 relative to the waste liquid entering the system at 16, will maintain the necessary level of dissolved oxygen (i.e., from two to eleven parts per million). In one system constructed accordance to FIGURE 1, satisfactory results were obtained at a rate of about 6:1 to 8:1, with one fifth of the flow returning through the line 27 and the remainder circulating through the distribution heads 32, 34.

In the maintenance of the microbiological community in the pond 20, it is apparent that the dispersed bark fibers 54 provide convenient resting and breeding places for the bacteria and other aerobic microorganisms, and serve to prevent their being swept through the tank by the current. However, the successful growth of this microbiological community may also depend on the solution of certain additional problems. For example, considerable heat is evolved in the life cycle of the community. Thus, each time a member of the community consumes colloidal solids attached to the fibers (or other microorganisms lower on the scale) a substantial portion of the energy received is used to carry on its metabolism and movement, a smaller proportion is discharged as waste, and another small proportion is used in promoting growth. Most of the energy used in metabolism is converted to heat, and therefore must be removed from the system if ideal growth conditions are to be maintained. I have found that a further incidental advantage of my system is obtained by the capacity for evaporative cooling present in my hanging fiber section 15. This evaporative cooling tends to balance the heat generated by metabolism, and also in the electrophoretic attraction of the colloidal solids to the fibers. I have also found that the pathogenic or disease forming bacteria are killed in my system, primarily because they are not adapted to compete with the bacteria and other aerobic microorganisms (i.e., they are consumed by the amoebas and paramecium, etc.). Moreover, my system provides an improved ecological climate or environment which tends to produce higher organisms than the slime producing fungi normally found in sewage disposal systems, and particularly such systems of the trickling filter type. This beneficial result is due in part to a functioning of the microbiological community in the pond 20 to remove dissolved contaminants, such as dissolved sugars, starch, proteins, etc., while the hanging fibers are at the same time restoring dissolved oxygen to the effluent liquid. In general, this advantageous cooperation between the dispersed and hanging fiber sections is made possible by the preliminary removal of colloidal solids from the circulating effluent in the pond 20, thereby greatly reducing the tendency of such solids to clog the surface of the hanging fiber system.

In a typical operation involving a relatively small domestic sewage treating installation (capacity 100 persons), the system of apparatus shown in FIGURES 1 to 4 can be dimensioned as follows: tank—24 feet long by 16 feet wide by 8 feet deep; pond—21 feet by 16 feet by 6 feet deep; hanging fiber section—21 feet long by 16 feet wide by 5 feet in hanging length. In this unit the hanging fiber was immersed about one foot in the pond. The volumes of the pond and hanging fiber sections were approximately equal, or about 12 to 13 cubic feet per capita per day. In the treatment of sewage in this unit, effluent can be introduced to the pond in the reservoir 10, containing about 6500 to 9000 pounds of short fibers at a rate of 10,000 gallons per day. The entering liquid had a biological oxygen demand (BOD) ranging from 150 to 450 p.p.m., a dissolved oxygen content of approximately zero, visual clarity (by light conduction technique) ranging from 0 to 5. As entering liquid intermixes and proceeds through the body of liquid 20, the colloidal particles are held by the fibers 54 and removed, permitting the clarified water to pass the screen 18 into the chamber 62. Most of the liquid in the chamber 62 is circulated by the pump 24 through the distribution line 26 to the distributing heads 32, 34. The liquid then proceeds through the hanging fiber section 15, and returns to the tank 10 to complete the cycle. The effluent discharged at 22 is sufficiently clarified to permit discharge into the soil or into adjacent streams. The BOD of the treated discharge liquid (measured at point 22 in FIGURE 1) is 1 to 11 p.p.m., the dissolved oxygen content ranges from 3 to 11 p.p.m., clarity measures are of the order of 75 to 95, pH is approximately 7.0. The processing therefore results in an average reduction in BOD of about 99+%, and an average increase in dissolved oxygen content in excess of 4 p.p.m., a capacity of the light transmission approaching that of distilled water.

Figure 5:
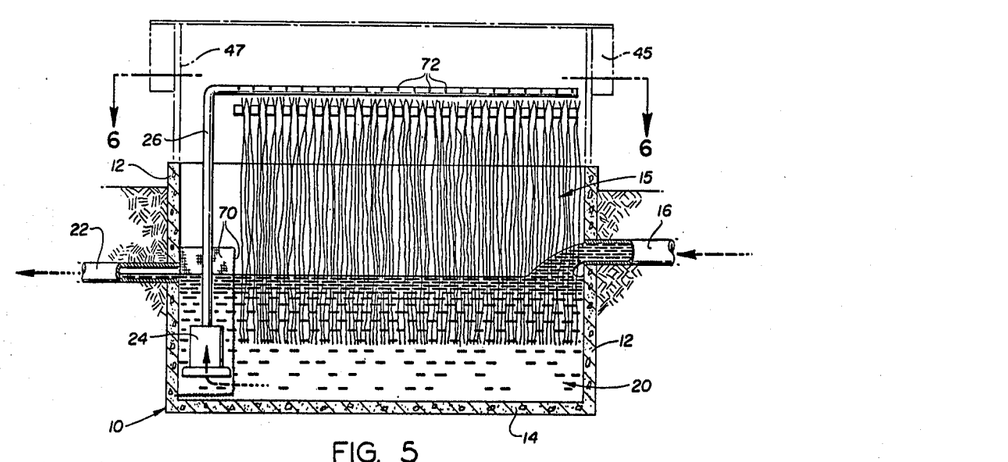
FIGURE 5 is a view in longitudinal section similar to FIGURE 1, illustrating another embodiment of the invention.
Figure 6:
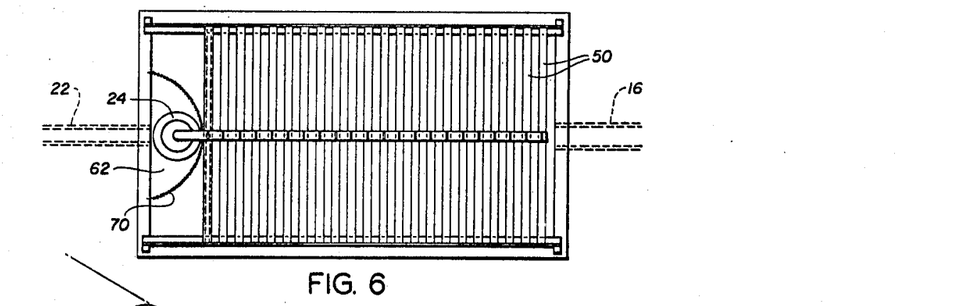
FIGURE 6 is a view in horizontal section along the line 6—6 of FIGURE 5.
Figure 7:
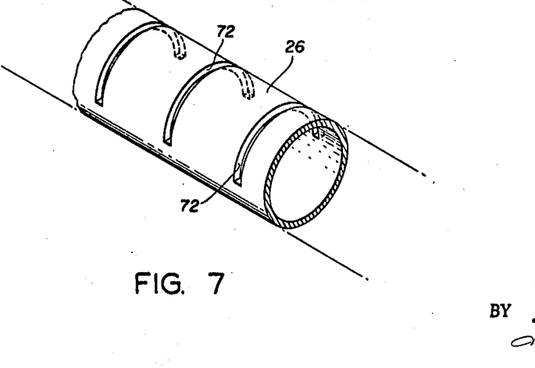
FIGURE 7 is a view in perspective illustrating a detail of the apparatus shown in FIGURE 5.

Many variations are possible in the processing, generally described above, and in the use of the apparatus herein disclosed. Thus, FIGURES 1 through 7 illustrate a below-ground installation (see FIGURES 1, 4 and 5). However, operable systems of the type just described may be constructed entirely above ground, requiring relatively simple changes in the feed and discharge connections. Likewise, it is possible to employ different types of screening barriers in the tank 10, to remove the fibers from the circulating effluent. By way of illustration FIGURE 5 illustrates a scheme for mounting the pumping means adjacent or within the discharge outlet which can be suitably screened against loss of the suspended fibers by the screening means 70. Modification or simplification of the liquid distribution mechanism is also possible. Thus, as particularly illustrated in FIGURES 5 and 6, the distribution system can comprise the main distribution conduit, cut at spaced-apart intervals as indicated at 72, to effect a fan-shaped spray of effluent liquid over the hanging fiber section 15. I have also found that many variations are possible in the makeup of the biological community established in the tank 10. For example, trout and other fish have been successfully employed in the chamber 62 to consume small crustaceans and aquatic worms which sometimes find their way through the screen 18.

A particular advantage of the present invention rests in the ability of the described waste treatment systems to effectively handle gross solids normally present in sewage and other liquid wastes. This beneficial result is made possible by the favorable ecological conditions established and maintained for the microbiological community and other higher order invertebrates and vertebrates in the pond 20. The resulting balanced biological community is highly organized to attack and consume gross solids. The waste systems of the present invention are therefore highly adapted for most any use, including municipal and rural use. They are particularly adapted, as more particularly described below, for use in rural areas as a basic self-contained, portable waste or sewage disposal system.

*Closed cycle process*

FIGURES 10 through 16 illustrate a further embodiment of my invention, particularly adapted for use as a completely self-contained sewage disposal system. The embodiment illustrated in these figures is substantially identical to the embodiments just described, except that the discharge line 22 is omitted. Instead, the entire effluent from the pond or reservoir is circulated overhead to the distribution means associated with the hanging fiber system, thereby providing a closed cycle system.

Figures 10, 11:
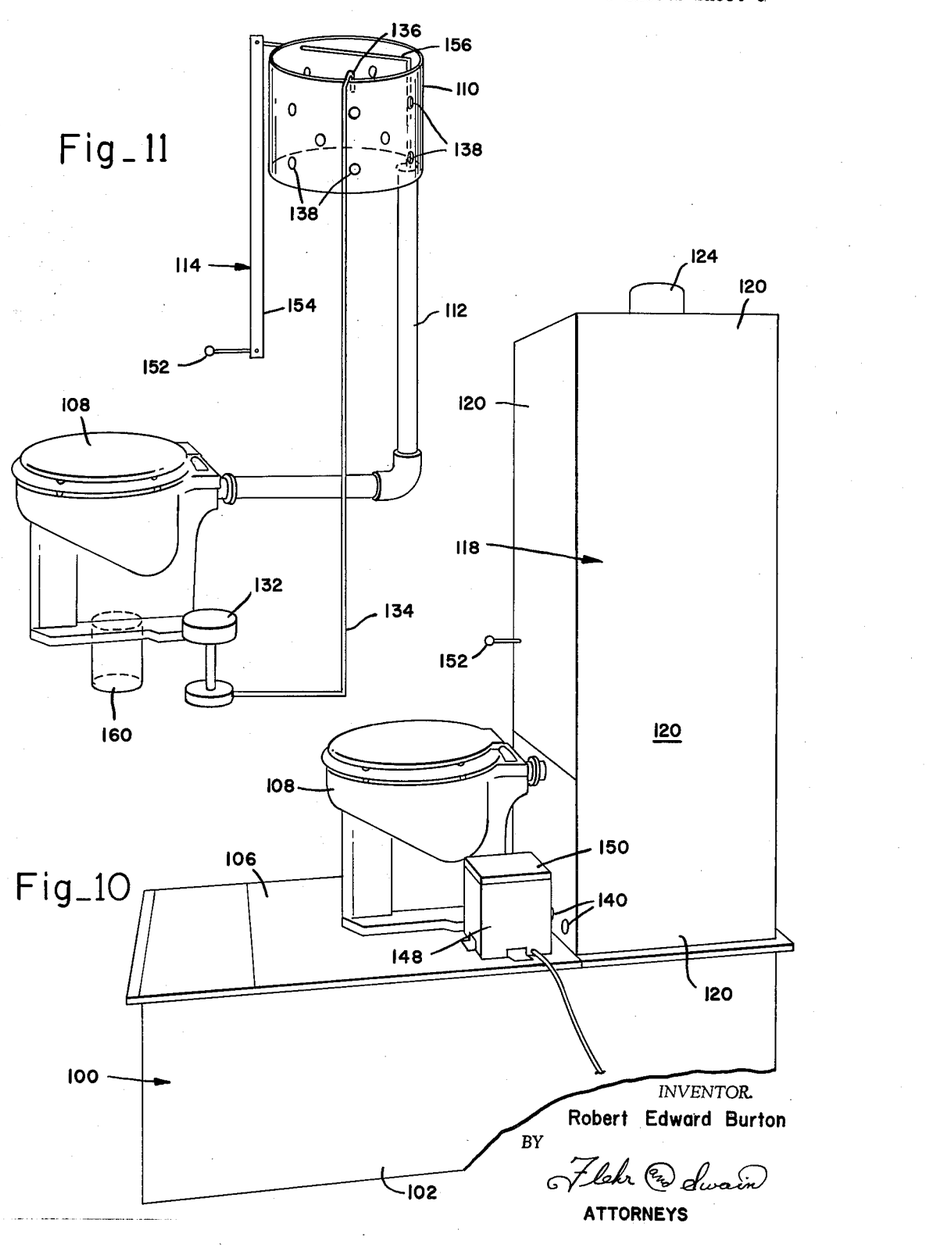
FIGURE 10 is a perspective view illustrating apparatus adapted to carrying out a closed cycle embodiment of the liquid waste treating system, in accordance with the invention.
FIGURE 11 is a schematic perspective view illustrating essential apparatus as employed in the embodiment of FIGURE 10.
Figures 12, 13, 14, 15, 16:
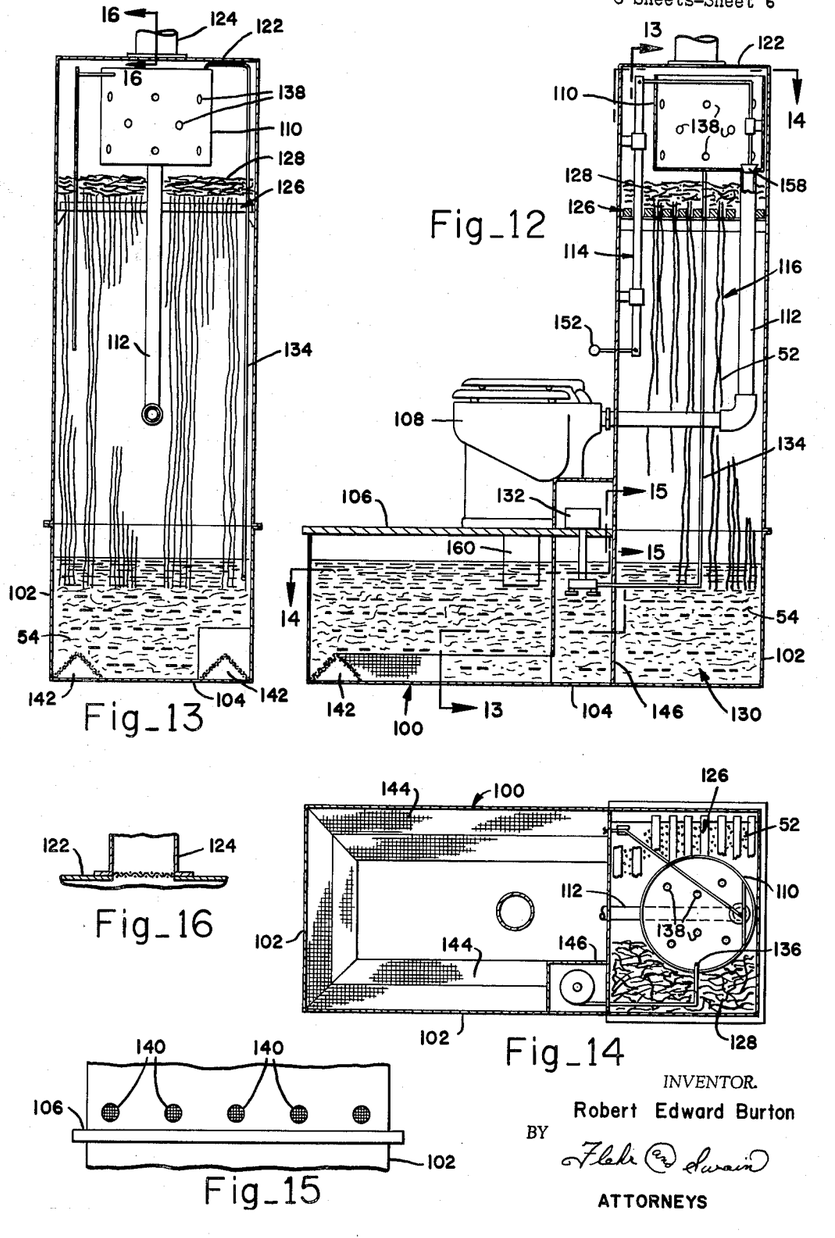
FIGURE 12 is a view in vertical section through the apparatus of FIGURE 10.
FIGURE 13 is a view in vertical section along the line 13—13 of FIGURE 12.
FIGURE 14 is a view in horizontal section along the line 14—14 of FIGURE 12.
FIGURE 15 is a detail view in elevation along the line 15—15 of FIGURE 12.
FIGURE 16 is a detail view along the line 16—16 of FIGURE 13.

As best illustrated in FIGURES 10 and 12, the closed cycle embodiment includes a reservoir or tank 100, which, except for size, is similar to the pond or reservoir 10 in the previous embodiment. In general, the tank 100 can be formed by suitable side and bottom wall means 102 and 104, and additionally by a top wall or platform 106 which partially covers the tank. The platform 106 provides a suitable support for a waste disposal unit 108, which may be a conventional siphon-type of flushing toilet. Thus, as more particularly illustrated in FIGURES 11 and 12, the toilet unit may be provided with an overhead flush tank reservoir 110 connected to the toilet by conduit means 112 and actuated by a flushing mechanism as generally represented at 114.

It will be understood that the tank or reservoir 100 and associated toilet unit 108 are intended to be substantially portable so as to facilitate installation in rural areas. Accordingly, the hanging fiber section illustrated at 116 in FIGURES 12 and 13, is suitably supported in an upstanding housing 118 to the rear of the platform 106, which also provides a support for the flushing system for the toilet 108. In general, the housing 118 can be formed by side walls 120 and by a top wall 122 which includes a suitable vent 124. Assuming an enclosure for the toilet, the vent 124 can be connected to vent pipes leading to a wall or roof opening leading to the atmosphere. As illustrated in FIGURE 16, the vent is preferably screened to prevent entry of leaves, animals, and the like.

Referring to FIGURES 12 through 14, the hanging fiber section 116 is mounted beneath the flush tank 110 on a support frame 126. The latter includes appropriate cross members to which the strips of bark or bark fiber making up the hanging fiber section can be attached, as previously described. Preferably, the strips of bark fiber are suspended on the frame 126 so that the individual fibers hang down into the reservoir 100. The frame 126 can also advantageously support a bed of loose fiber 128, which can serve to disperse the circulating liquids on to the hanging fibers.

It will be understood that the tank or reservoir 100 is adapted to receive a body of liquid 130 containing a profusion of dispersed, substantially individualized bark fibers, particularly redwood bark fibers, as previously described with reference to the pond 20 in the previous embodiments. In like fashion, the strips of bark fiber in the hanging fiber section 116 are preferably specially processed redwood bark fibers, having the characteristics previously described with reference to the hanging fiber sections 15.

As particularly shown in FIGURES 11 and 12, means are provided to continuously circulate liquid from the pond 130 upwardly to the flush tank 110. In the illustrated apparatus, such means includes a rotary pump 132 having its intake mounted within the body of liquid 130 and connected to a distribution line 134 leading from the pump intake upwardly to a point of discharge 136 within the flush tank. As illustrated, the flush tank 110 is provided with a series of apertures 138 arranged around the sides and bottom of the tank through which the circulating liquid falls onto the bed of loose fiber 128. The bed of loose fiber disperses the circulating liquid uniformly to the hanging fiber section 116, where it slowly descends down the individual fibers 52. As it descends, the liquid is broken up into thin liquid films which readily absorb air (oxygen and nitrogen) while simultaneously dispersing carbon dioxide and metabolic heat from the microbiological community present within the hanging fibers. When the circulating liquid finally reaches the bottom of the fiber section to mingle with the toilet wastes in the body of liquid 130, it is sufficiently aerated to supply the oxygen requirements of principal microbiological community living within the body of liquid 130 in the main reservoir. The circulating liquid has also been evaporatively cooled during this descent and thus additionally serves to control the metabolic heat evolved within the body of liquid 130. It will be understood that this processing is substantially as described in connection with the previous embodiments illustrated in FIGURES 1 through 9.

Referring to FIGURES 10 and 15, the housing 118 for the hanging fiber system is advantageously provided with ventilating ports 140. These ventilating ports permit free circulation of air through the hanging fiber section 116 and the body of loose fibers 128 located within the housing. These ventilating ports are preferably screened to prevent entry of undesired contaminants and are of a size to cooperate with the ventilation system associated with the vent 124.

Referring again to the circulating system, I prefer to operate the pump 132 continuously and, consequently, advantageously employ screened circulatory passages 142 extending about the bottom of the fiber tank 100, in communication with the pump intake. As illustrated, the screening members 144 forming the passages 142 extend over a fairly large area of the tank and preferably are provided with openings of sufficiently small size to prevent undesired circulation of the short bark fibers 54 through the pump and circulatory system. In general, I have found that an expanded metal screen having a mesh of approximately one-half inch can be satisfactorily employed for use in the screening members 144 in my system. As also illustrated, the pump 132 can be advantageously mounted within an enclosure or housing 146 which extends down into the tank 100. This arrangement permits the pump to be mounted on the platform 106 within a protective enclosure 148 which may have an access opening for servicing, as at 150.

As shown in FIGURES 11 and 12, the flushing mechanism for the toilet unit 108 may comprise a very simple mechanical mechanism including a flushing handle 152 pivotally mounted in the housing 118 and pivotally attached to a vertical rod 154. The latter can be pivotally attached at its upper end to a transverse rod and flash bulb assembly 156, 158, pivotally mounted on the side wall of the flush tank 110. Flushing of the toilet unit 108 is accomplished by operating the flush handle to lower the vertical rod 154, causing the transverse rod 156 to raise the flush bulb 158 from its seat on the flushing conduit 112. This operation permits the liquid in the flush tank 110 to fill the toilet bowl past the siphon point, thereby initiating a conventional flushing action which discharges the contents of the toilet bowl to the body of liquid 130 in the fiber tank 100. Discharge occurs through a suitable toilet waste discharge pipe 160 associated with the toilet unit 108.

The procedure involved in installing and operating a closed cycle unit of the type illustrated in FIGURES 10 through 16 can now be briefly described as follows:

Assuming fabrication of a complete unit of the type shown in FIGURE 10, such unit can be conveniently shipped "dry" to the point of intended use. Such unit can include strips of bark fiber in position in the fiber section 116. When the unit has been appropriately installed, for example, within an enclosure, the tank 100 is filled with water to a desired operating level to provide the body of liquid 130. The body of liquid 130 is then seeded with a profusion of substantially individualized bark fibers 54, particularly redwood bark fibers of a character and dimension as herein described. Such fibers can initially be placed in the tank 100 in a "dry" condition. The body of fiber-containing liquid can now be seeded with an incipient or beginning microbiological community which may be in the form of a quantity of lake or river water gathered at a point of known microbiological activity. Such community can also be shipped "dry" with the unit. Alternatively, the microbiological community (e.g., bacteria, paramecium, etc.) may be naturally present in the liquid originally introduced into the tank 100. As previously noted, the microbiological community is comprised of aerobic micro-organisms which serve to renew the fibers for continued use in the separation process, by continuously digesting colloidal solids which are attracted to and separated from the waste liquid by means of the bark fibers in the body of liquid 130.

Operation of the unit is initiated by placing the pump 132 in operation to circulate liquid continuously from the body of liquid 130 upwardly through the distribution line 134 to the flushing reservoir 110. There the circulating liquid passes through the apertures 138 onto the loose bed of bark fibers 128, from whence it circulates downwardly along the fibers 52 of the hanging fiber section 116. As previously noted, the suspended strips of bark fibers are preferably redwood or like bark fibers which have been specially processed to greatly enlarge the exposed surface area of the individual bark fibers in each strip. As the circulating liquid slowly descends the fibers in the hanging fiber section 116 it is separated into a myriad of thin liquid films which greatly increase the liquid-gas interface, thereby providing conditions which greatly encourage absorption of air into the circulating liquid. As a consequence, return of the circulating liquid to the tank 100 serves to maintain the necessary level of dissolved oxygen within the body of liquid 130.

Assuming use of the toilet 108, and flushing of the toilet with the flushing mechanism 114, the toilet wastes in the form of urine and feces enter the body of liquid 130 through the toilet discharge 160. Within the body of liquid 130, the freely dispersed redwood fibers attract and hold the colloidal solids which are continuously consumed and digested by micro-organisms forming the microbiological community within the tank 100. In this way the fibers are constantly renewed to again attract the colloidal solids in a continuous cycle. As previously noted, the attraction of the colloidal solids by the fibers and the resultant separation by means of the micro-organisms present in the system ensures a virtually complete removal of colloidal contaminants from the system and a constant clarification of the waste effluent.

In addition to colloidal solids, dissolved nutrients present in the waste liquids are also removed by the microorganism living within the system. A similar result occurs with respect to gross and settleable solids present in the toilet wastes. This result is made possible by the favorable ecological conditions which are established in the body of liquid 130 not only for the microbiological community, but also for other higher order invertebrates and vertebrates. As previously noted, the conditions existing within the fiber tank, when coupled with circulation of the waste liquid over the hanging fiber system for simultaneous aeration and reduction of the biological oxygen demand (BOD), makes possible the establishment and maintenance of a balanced biological community that is highly organized to attack and consume gross and settleable solids. Significantly, the virtually complete separation of colloidal contaminants through combined use of dispersed bark fibers and aerobic microorganisms in the pond 130 makes possible an effluent which is not foul and which can be effectively circulated over the hanging fiber section 116 to absorb sufficient dissolved oxygen to maintain the microbiological community in the pond. Moreover, the dispersed bark fibers in the pond provide convenient resting and breeding places for the bacteria and other aerobic microorganisms which prevent their being swept through the tank by the circulating liquid. The heat energy achieved through metabolism is effectively removed by the evaporative cooling which takes place in the hanging fiber section. These favorable conditions in the closed cycle unit also tend to lead to the destruction of pathogenic or disease forming bacteria, through consumption by more active bacteria, amoebae, paramecia, and other aerobic micro-organisms which thrive in the pond and in the hanging fiber section of the system.

It should be noted that my waste disposal systems are effective to remove both colloidal and gross organic solids from waste systems. Inorganic wastes, such as certain precipitated salts, sand, and the like, will not be attacked and consumed by the microbiological community. As a consequence, it is desirable to periodically flush my system with fresh water, say every month or so. Alternatively, makeup water can be added (to achieve overflow) so as to carry off these inorganic salts. In several installations, this has been conveniently accomplished by providing a hand washing basin having a discharge which drains into the tank 100. The amounts of water flowing into the tank through repeated use of the hand washing basin have been found sufficient to maintain the closed cycle system without separate flushing, except at very infrequent intervals.

As a further variation, it has also been found desirable to chemically adjust the pH of the body of liquid 130 in the tank 100. A preferred operating range of the closed cycle system falls within the range from pH 5 to 8, which is the normal pH range for the life processes of the microorganisms making up the microbiological community. However, the redwood bark fibers preferably employed in my system are slightly acid in character with the result that it is initially desirable to add suitable buffering agents to adjust the pH of the body of liquid to within the preferred operating range of pH 5 to 8. However, once the system is in operation, pH ceases to become a significant factor, primarily because raw sewage is slightly basic in character, having a pH in the range of 7 to 8, so that a neutral pH is naturally achieved.

In a typical operation involving a closed cycle waste disposal unit of the type illustrated in FIGURES 10 through 16 (capacity two to four persons), the unit can be dimensioned as follows: tank, 5 feet long by 2 feet wide by 1.5 feet deep; pound, 6 feet by 2½ feet by 1½ feet deep;

hanging fiber section 1½ feet by 2 feet by 4 feet in hanging length. The hanging fiber is immersed by about 6 inches in the pond. Excluding overlap, the volumes of the pond and hanging fiber sections were approximately equal, or about 8 to 12 cubic feet. In the use of the unit, the unit was effective to handle the wastes of two normal humans averaging 150 pounds in weight. The BOD of the pond 130 (measured in the morning) is 2 to 11 p.p.m., the dissolved oxygen content ranges from 4 to 11 p.p.m., clarity measures are of the order of 70 to 95, and pH is approximately 7.

In summary, essential characteristics of the treating units and processes just described are effective removal of colloidal solids from the entering waste containing liquids in an easy, convenient, economical manner, simultaneously with the restoration of oxygen to the liquid to reduce the biological oxygen demand. The processing specifically provides for the separation and digestion of the colloidal solids from the fibers for repeated use in the processing. The processing is also effective to remove gross solids. Since the only moving part is a simple pump mechanism, my systems can be easily designed to treat any volume of sewage or like waste liquid, ranging from the discharge of a single dwelling to the discharge from municipalities and plants. The operation of my systems also requires relatively little supervision, generally no more than that the equipment be maintained to ensure that there is no plugging of lines and that circulation of air is regulated to a desirable effective temperature between about 30° to 90° F. The units are also easily installed and operated, either as closed cycle units or as systems discharging clarified effluent and require only about two to four weeks to establish a microbiological community which will function efficiently.

I claim:

1. In a method for separating organic colloidal solids and other organic solid waste materials from liquids, the steps of forming an aqueous liquid body as part of a closed system, dispersing a profusion of substantially individualized bark fibers in said liquid body, a large proportion of said fibers being present as substantially individualized units dispersed throughout said body of liquid, introducing waste liquid containing suspended colloidal solids to said liquid body to effect intermixing of the liquids, said colloidal solids being attracted to and caused to adhere to said individualized fibers, separating a partially clarified portion of the intermixed liquids from said fibers and attached colloidal solids, circulating said separated portion of the intermixed liquids as a thin liquid film through a liquid-gas contact zone, simultaneously circulating an oxygen-containing gas through said liquid-gas contact zone, returning said separated portion of the intermixed liquids to said liquid body, and continuously separating and removing the colloidal solids from the bark fibers in said liquid body to permit the renewed use of said fibers in attracting colloidal solids.

2. A method as in claim 1 wherein said organic solid waste materials are sewage wastes.

3. A method as in claim 2 wherein said colloidal solids are removed from said fibers by aerobic micro-organisms present in said body of liquid.

4. A method as in claim 3 wherein said other organic solid waste materials are removed from said body of intermixed liquids by a balanced community of aerobic microorganisms, invertebrates and water-dwelling vertebrates present in said body of liquid.

5. In a continuous method for separating both gross and colloidal solids from waste liquids while simultaneously restoring oxygen to such liquids to reduce the biological oxygen demand, the steps of dispersing a profusion of substantially individualized bark fibers in a body of aqueous waste liquid whereby said fibers are distributed throughout said body as freely dispersed fibers, suspending a plurality of elongate strips of bark fibers above said body of liquid, said suspended strips of bark fibers being characterized by an unusually large surface area in relation to the volume of said strips, introducing fresh waste liquid containing suspended colloidal solids into said body of liquid to effect intermixing of the liquids, said colloidal solids being attracted to and caused to adhere to said freely dispersed fibers, separating the intermixed liquids from the fibers and attached colloidal solids, circulating said separated intermixed liquids upward and over said suspended strips of bark fibers so that said intermixed waste liquids pass down and through said strips of bark fibers, and returning said separated intermixed liquids to said body of liquids.

6. A method as in claim 5 wherein said gross and colloidal solids are continuously consumed by a balanced microbiological community maintained in said body of liquid.

7. In a continuous method for separating organic solids including colloidal solids from waste liquids while simultaneously restoring oxygen to said waste liquids to reduce the biological oxygen demand, the steps of forming an aqueous liquid body as part of a circulatory system, dispersing a profusion of bark fibers in said liquid body, a large proportion of said fibers being present in the form of relatively short, substantially individualized units dispersed below the surface of said body of liquids, suspending a plurality of strips of bark fibers above said body of intermixed liquids, said strips being composed of elongate substantially individualized hanging fibers, continuously introducing fresh waste liquid containing suspended colloidal solids to said liquid body to effect intermixing of said liquids, said colloidal solids being attracted to and caused to adhere to the relatively short fibers in said body of liquids, continuously circulating a portion of said intermixed liquids upward and over said suspended strips of elongate bark fibers whereby said intermixed liquids descend slowly down the surface of said individualized hanging fibers, and returning said circulating portion of intermixed liquids to said body of liquid to effect further intermixing.

8. In a continuous method for separating colloidal solids from waste liquids while simultaneously restoring oxygen to such liquids to reduce the biological oxygen demand, the steps of dispersing a profusion of substantially individualized bark fibers in a body of aqueous waste liquid whereby said fibers are distributed throughout said body as freely dispersed fibers, suspending a plurality of elongate strips of bark fibers above said body of liquid, said suspended strips of bark fiber being characterized by an unusually large surface area in relation to the volume of said strips, introducing fresh waste liquid containing suspended colloidal solids into said body of liquid to effect intermixing of the liquids, said colloidal solids being attracted to and caused to adhere to said freely dispersed fibers separating the intermixed liquids from the fibers and attached colloidal solids, circulating said intermixed liquids upward and over said suspended strips of bark fibers so that said intermixed waste liquids pass down and through said strips of bark fibers, and continuously separating a portion of the intermixed liquids from said fibers and attached colloidal solids as a clarified end product.

9. A method as in claim 8 wherein said colloidal solids are sewage wastes.

10. A method as in claim 8 wherein said colloidal solids are canning wastes.

11. A method as in claim 8 wherein the colloidal solids are removed from the fibers in said body of intermixed liquids by aerobic micro-organisms, invertebrates and water-dwelling vertebrates.

12. A method as in claim 8 wherein the population of aerobic micro-organisms in said liquid body are kept in check by a microbiological community of higher order present in said body of liquid and in said suspended strips of bark fiber.

13. In a continuous method for separating colloidal solids from waste liquids while simultaneously restoring oxygen to said waste liquids to reduce the biological oxygen demand, the steps of forming an aqueous liquid body as part of a circulatory system, dispersing a profusion of bark fibers in said liquid body, a large proportion of said fibers being present in the form of relatively short, substantially individualized units dispersed below the surface of said body of liquids, suspending a plurality of strips of bark fibers above said body of intermixed liquids, said strips being composed of elongate substantially individualized hanging fibers, continuously introducing fresh waste liquid containing suspended colloidal solids to said liquid body to effect intermixing of said liquids, said colloidal solids being attracted to and caused to adhere to the relatively short fibers in said body of liquids, continuously circulating said intermixed liquids upward and over said suspended strips of elongate bark fibers whereby said intermixed liquids descend slowly down the surface of said individualized hanging fibers and return to said body of liquid to effect further intermixing, and continuously separating a portion of the intermixed liquids from said relatively short fibers and attached colloidal solids to produce a clarified end product.

14. A method as in claim 13 wherein the relatively short bark fibers dispersed in said liquid body are redwood fibers having a thickness of no greater than about 1 millimeter and a length of no greater than about 1 to 10 centimeters.

15. A method as in claim 13 wherein the elongate hanging bark fibers in said strips of bark fibers are redwood fibers having a thickness no greater than about 1 millimeter, and said strips having a length ranging from 4 to 20 feet.

16. A method as in claim 13 wherein the strips of elongate bark fibers suspended over said body of liquid are characterized by a surface area not less than 500 square feet for each cubic foot of bark.

17. A method as in claim 13 wherein a portion of said recirculated intermixed liquids is returned directly to said body of liquids adjacent the point of introduction of said fresh waste liquid.

18. Apparatus for separating colloidal solids from waste liquids and simultaneously restoring oxygen to said liquids to reduce the biological oxygen demand, comprising: wall means forming a reservoir open at the top, inlet means for introducing waste liquids into said reservoir to form a body of liquid therein, a circulatory system in fluid communication with the body of liquid in said reservoir, said criculatory system including means for conveying liquid from said body of liquid to a position above the open top of said reservoir, screening means separating said liquid-conveying means from the body of liquid in said reservoir, means above said reservoir supporting a plurality of strips of elongate bark fibers so that the latter are suspended and fall into the body of liquid in the reservoir, distribution means associated with said circulatory system and cooperating therewith to distribute liquid circulated from said body of liquid onto said suspended strips of bark fibers, and discharge means protected by said screening means and leading to a point of discharge outside said reservoir.

19. Apparatus as in claim 18 wherein said wall means are substantially below ground level.

20. Apparatus as in claim 18 wherein said screening means comprises a barrier formed of felted and compressed bark fibers.

21. Apparatus as in claim 18 wherein said screening means comprises a barrier surrounding said means for conveying liquid.

22. Apparatus as in claim 18 wherein said circulatory system includes conduit means extending upward from said reservoir and extending horizontally above said means for supporting the suspended fibers.

23. Apparatus as in claim 22 wherein said conduit means communicate with distribution outlets therein adapted to spray circulating liquid over said suspended bark fibers.

24. Apparatus as in claim 22 wherein said conduit means communicate with distribution outlets therein adapted to spray circulating liquid over said suspended bark fibers.

25. Apparatus as in claim 18 wherein said means for supporting the suspended fibers comprises a plurality of lateral supports extending over substantially the entire surface area of the body of liquid in said reservoir.

26. Apparatus for separating organic solids including colloidal solids from waste liquids, while simultaneously restoring oxygen to said liquids to reduce the biological oxygen demand comprising: wall means forming a reservoir, inlet means for introducing waste liquids into said reservoir to form a body of liquid therein, a circulatory system in fluid communication with the body of liquid in said reservoir, said circulatory system including means for conveying liquid from said body of liquid to a position above said reservoir, screening means separating said liquid-conveying means from the body of liquid in said reservoir, means above said reservoir supporting a plurality of strips of elongate bark fibers so that the latter are suspended and fall into the body of liquid in the reservoir, and distribution means associated with said circulatory system and cooperating therewith to distribute liquid circulated from said body of liquid onto said suspended strips of bark fibers.

27. Apparatus as in claim 26 wherein said wall means form part of a portable sewage disposal system.

28. Apparatus as in claim 27 wherein said inlet means for introducing waste liquids into said reservoir comprise a toilet bowl in communication with said reservoir, and means to discharge the contents of said toilet bowl into said reservoir.

29. Apparatus as in claim 26 wherein said screening means forms part of a barrier surrounding and separating said means for conveying liquid from said reservoir.

30. Apparatus as in claim 26 wherein said circulatory system includes conduit means extending upward from said reservoir to a position above said means for supporting the suspended fibers.

31. Apparatus as in claim 30 wherein said conduit means communicate with distribution outlets adapted to spray circulating liquid over said suspended bark fibers.

32. Apparatus as in claim 26 wherein said means for supporting the suspended fibers extends over a portion of the surface area of said body of liquid in said reservoir.

References Cited by the Examiner
UNITED STATES PATENTS

| | | | |
|---|---|---|---|
| 2,158,954 | 5/1939 | Zigerli | 210—18 X |
| 2,995,434 | 8/1961 | Burton | 71—8 X |
| 3,123,555 | 3/1964 | Moore | 210—151 X |

MORRIS O. WOLK, *Primary Examiner.*